May 1, 1928.

H. C. MUMMERT ET AL 1,668,122

AEROPLANE LANDING GEAR

Filed May 25, 1926

INVENTORS
HARVEY C. MUMMERT,
BY JOSEPH F. MEADE

ATTORNEY

Patented May 1, 1928.

1,668,122

UNITED STATES PATENT OFFICE.

HARVEY C. MUMMERT AND JOSEPH F. MEADE, OF HAMMONDSPORT, NEW YORK.

AEROPLANE-LANDING GEAR.

Application filed May 25, 1926. Serial No. 111,478.

My invention relates to aircraft landing gears and more particularly to a combination land and snow landing gear for aeroplanes.

In operating aircraft, and especially aeroplanes, during the winter season when and where snow is likely to be encountered, it has been the practice heretofore to use interchangeably either wheels or skis according to ground conditions at the time and place of flight. Such interchangeability while entirely satisfactory so long as ground conditions remain suitably constant, becomes increasingly and distinctly otherwise under other and different conditions. If, for instance, a comparatively heavy snow is encountered at the time and place of "take-off" and a comparatively light snow, or no snow at all, is encountered at the time and place of "landing" or vice versa, neither wheels alone nor skis alone will constitute a satisfactory gear. An aeroplane gear, if entirely satisfactory, should be able to properly and safely function regardless of the condition of the ground. Skis should be provided to admit of a proper landing in the event of snow, and wheels should be provided to admit of a proper landing in the absence of snow, the skis and wheels being so relatively arranged and disposed as to in no way interfere one with the other and if necessary (as for instance under circumstances where it is a moot question which type gear is best) to cooperate and function instantaneously, each in its proper capacity, without attention and without retracting or extending any part or portion of the gear. The combination landing gear of the present invention has been found by actual test to properly fulfill this long felt want or need.

Other objects of the invention will be hereinafter set forth.

In the drawings, wherein like reference characters denote like or corresponding parts, Fig. 1 is a side elevation of our improved combination land and snow landing gear for aircraft;

Figure 1:
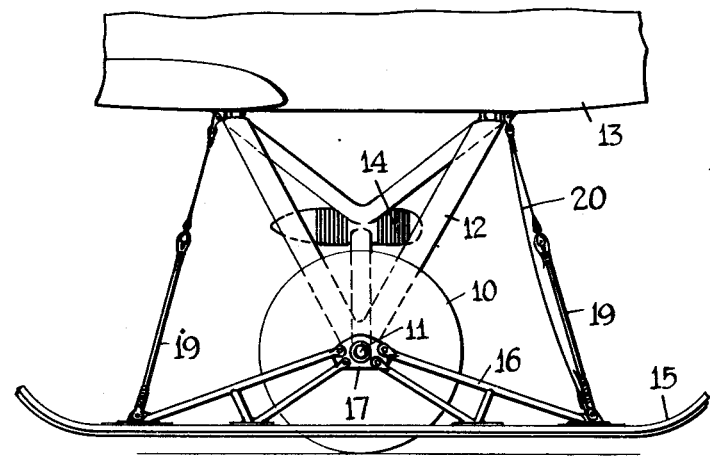
Figure 2:
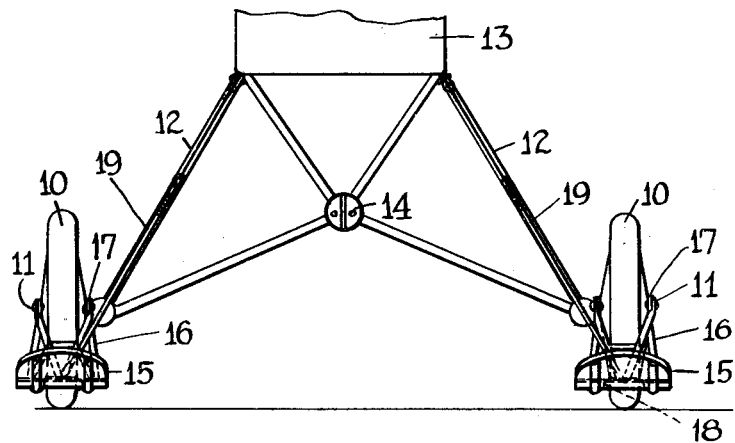
Fig. 2 is a front elevation.
Figure 3:
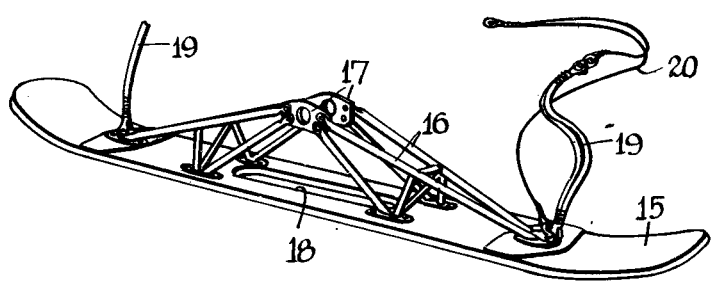
Fig. 3 is a perspective view of one of the landing skis.

In the embodiment of the invention selected for illustration, a landing gear of the type disclosed in the co-pending application of Harvey C. Mummert (one of the joint inventors herein), filed December 17, 1925, Serial Number 75,896, is shown. Such landing gear comprises wheels 10—10 mounted on axle stubs 11—11 and two substantially triangular frames 12—12 pivoted to the fuselage or body 13 of the machine, the pivot axes in each instance being extended in a fore and aft direction. Said frames 12—12 (see Fig. 2) are yieldingly fastened together as at 14 by an appropriate number of shock absorber elastics or cords. Under the impact of landing, said frames 12—12 and the wheels 10—10 mounted, one at the outer end of each said frame, are movable outwardly and upwardly against the action of said shock absorbing means. This particular type of landing gear, however, is merely illustrative of the invention and, if desired, a different type landing gear may be used instead.

In addition to the wheels 10—10 the landing gear comprises skis 15—15 of more or less conventional form. Each ski 15 is hung or suspended from one or the other of the axle stubs 11—11. Preferably the skis 15 are mounted directly upon said axle stubs as by means of braces 16 appropriately grouped at opposite sides of the wheels 10, each said group being provided at its upper end with a suitable hub plate 17 thru which the axle stubs 11—11 extend. Beneath said plate 17 the skis 15 have formed therein an elongated slot or opening 18 thru which the wheels 10—10 project.

At its opposite ends, each ski 15 has fastened thereto an elastic cord 19 by means of which it is yieldingly held in place. Should either end of either ski engage a ground obstruction during use, the cords 19, being elastic, will permit such ground engaging ski end to move upwardly; the ski in its entirety pivoting during such movement about the axis stubs 11—11 as centers. A fixed length stop or wire 20 is provided at the forward end of each ski to definitely limit its pivotal movement and at the same time hold it (the ski) front end foremost, into the air stream during flight.

It will be noted from the above that a combination land and ski landing gear characterized as herein set forth is distinctly advantageous in that a successful take-off and a successful landing can be made during the winter season and regardless of the condition of the ground. As both the skis and the wheels are mounted on the same axle stubs, obviously both will move at all times together. Neither is capable, under any circumstances, of yielding vertical movement independently of the other notwithstanding the fact that the skis may, under certain circumstances, pivotally yield wholly independently of the wheels. By extending the wheels beneath the skis the landing gear, in the absence of snow, may properly function as an ordinary wheeled landing gear. Should snow of any considerable depth be encountered, the skis 15 would immediately come into use as in landing or taking off with the ground covered by an appreciable depth of snow, the wheels will merely break thru the snow crust until the skis support the entire weight of the machine. Such a landing gear is further advantageous in that the same shock absorber means is used for both a wheel landing, or for a ski landing, or for a landing in which both the wheels and skis are alternately used. For cross-country flying where ground conditions are unknown in advance of a flight, such a landing gear finds its greatest use. Heretofore, where skis and wheels have been used in combination, separate shock absorbing means has been provided for each character of gear. Moreover, if desired, the landing gear can be made retractable without in any way departing from the spirit of the invention as claimed.

While I have described my invention in detail in its present preferred embodiment, it will be obvious to those skilled in the art after understanding my invention, that various changes and modifications may be made therein without departing from the spirit or scope thereof. I aim in the appended claims to cover all such modifications and changes.

What we claim is:

1. In an aeroplane landing gear, an axle, a ski hung below and carried by said axle, said ski having formed therein an opening, a wheel mounted on said axle to fit within said opening, said wheel and ski being incapable of relative movement under impact tho capable of simultaneous vertical movement with said axle, and a shock absorber for said axle adapted to yieldingly resist the simultaneous vertical movement of both said wheel and ski.

2. A landing gear for aeroplanes including a supporting structure, wheels carried by said supporting structure, an axle portion for each wheel incorporated in said supporting structure, a ski carried by each said axle portion, each ski having an opening formed therein thru and beyond which said wheels project, and braces extending between each ski and its associated axle portion, the braces, in each instance, being grouped on opposite sides of said wheels to hold said skis against bodily yielding movement independently thereof.

3. In an aeroplane landing gear, an axle, a ski mounted on said axle, a wheel likewise mounted on said axle to extend beneath said ski, said ski and said wheel being incapable of relative movement under impact, and a shock absorber commonly serving said axle, wheel and ski.

4. In an aeroplane landing gear, an axle yieldingly movable under impact, a ski carried by and movable with said axle, a wheel carried by and movable with said axle and extended beneath said ski, said wheel having an axis of rotatation well above said ski and said axle preventing relative movement between said wheel and said ski, and a yielding means for resisting the impact movement of said axle.

In testimony whereof we hereunto affix our signatures.

HARVEY C. MUMMERT.
JOSEPH F. MEADE.